United States Patent
Lee et al.

(10) Patent No.: US 10,883,529 B2
(45) Date of Patent: *Jan. 5, 2021

(54) NUT INTEGRATED WITH BRACKET AND METHOD OF MANUFACTURING THE SAME

(71) Applicants: Hyundai Motor Company, Seoul (KR); Kia Motors Corporation, Seoul (KR); PROTECH KOREA CO. LTD., Gwangju (KR); Sung Woo Hitech Co., Ltd., Busan (KR)

(72) Inventors: Heui Bom Lee, Gyeonggi-do (KR); Dongjin Lee, Gyeonggi-do (KR); Juncheul Jung, Gyeonggi-do (KR); Jeong Rok Yun, Gwangju (KR); Mun Yong Lee, Busan (KR); Sang Hee Lee, Gwangju (KR); Sang Lae Lee, Ulsan (KR)

(73) Assignees: Hyundai Motor Company, Seoul (KR); Kia Motors Corporation, Seoul (KR); Sung Woo Hitech Co., Ltd., Busan (KR)

( * ) Notice: Subject to any disclaimer, the term of this patent is extended or adjusted under 35 U.S.C. 154(b) by 652 days.

This patent is subject to a terminal disclaimer.

(21) Appl. No.: 15/684,048

(22) Filed: Aug. 23, 2017

(65) Prior Publication Data

US 2018/0163767 A1 Jun. 14, 2018

(30) Foreign Application Priority Data

Dec. 14, 2016 (KR) ........................ 10-2016-0170800

(51) Int. Cl.
*B21K 1/70* (2006.01)
*F16B 37/04* (2006.01)
(Continued)

(52) U.S. Cl.
CPC ............ *F16B 37/044* (2013.01); *B21D 22/20* (2013.01); *B21D 28/02* (2013.01); *B21D 35/001* (2013.01);
(Continued)

(58) Field of Classification Search
CPC ... B21K 1/46; B21K 1/56; B21K 1/64; B21K 1/66; B21K 1/70; B21D 53/24;
(Continued)

(56) References Cited

U.S. PATENT DOCUMENTS 5,503,596 A * 4/1996 Nagayama ............... B21K 1/70
470/20

FOREIGN PATENT DOCUMENTS

JP 07-241624 A 9/1995
JP H10338159 A 12/1998
(Continued)

*Primary Examiner* — Debra M Sullivan
(74) *Attorney, Agent, or Firm* — Mintz Levin Cohn Ferris Glovsky and Popeo, P.C.; Peter F. Corless (57) ABSTRACT

A nut integrated with a bracket and a method of manufacturing the same is provided. The method includes a predrawing operation that forms a reference aperture and a processing cross section in the plate material supplied between the punch and the die, forming a beading portion and piercing a center of the beading portion. A forging operation forms a pipe portion having a tube shape and processes an exterior circumferential surface of the pipe portion. A precision forging process adjusts dimensions of the pipe portion formed in the tube shape, forms a protruding end that extends on a tip surface of the pipe portion and compresses the pipe portion to remove residual burrs on a surface. A post-processing operation cuts the processing cross section to a final product shape, and forms a threaded tap on an interior circumferential surface of the pipe portion.

6 Claims, 4 Drawing Sheets

(51) Int. Cl.
*B21D 35/00* (2006.01)
*B21D 41/04* (2006.01)
*F16B 37/02* (2006.01)
*B21D 53/24* (2006.01)
*B21D 28/02* (2006.01)
*B21J 9/02* (2006.01)
*B21D 22/20* (2006.01)
*B21J 5/08* (2006.01)
*B21J 7/14* (2006.01)

(52) U.S. Cl.
CPC ............. *B21D 41/04* (2013.01); *B21D 53/24* (2013.01); *B21J 5/08* (2013.01); *B21J 7/14* (2013.01); *B21J 9/022* (2013.01); *B21K 1/70* (2013.01); *F16B 37/02* (2013.01)

(58) Field of Classification Search
CPC .. B21D 22/206; B21D 35/001; B21D 24/005; B21J 7/14; B21J 9/022
See application file for complete search history.

(56) References Cited

FOREIGN PATENT DOCUMENTS

| | | |
|---|---|---|
| JP | 4607985 B2 | 1/2011 |
| KR | 30-0433386-0003 S | 12/2006 |
| KR | 10-2009-0083136 A | 8/2009 |
| KR | 10-1251043 B1 | 4/2013 |
| KR | 10-2015-0109917 A | 10/2015 |

* cited by examiner

NUT INTEGRATED WITH BRACKET AND METHOD OF MANUFACTURING THE SAME

CROSS-REFERENCE TO RELATED APPLICATION

This application claims priority to and the benefit of Korean Patent Application No. 10-2016-0170800 filed in the Korean Intellectual Property Office on Dec. 14, 2016, the entire contents of which are incorporated herein by reference.

BACKGROUND

(a) Field of the Disclosure

The present disclosure relates to a nut integrated with a bracket and a method of manufacturing the same, and more particularly, to a nut integrated with a bracket, in which the bracket and the nut are integrally formed by processing a plate material supplied between a punch and a die, and a method of manufacturing the same.

(b) Description of the Related Art

Generally, various coupling techniques are used for connecting portions of vehicle components, industrial machine components or consumer electronics components. In particular, mechanical coupling that use bolts and nuts to couple the components is typically used at a particular portion subject to a high load or consistent impact. An example of a mechanical coupling method includes a mounting structure implemented in a weld nut the weld nut is disposed on one component and another component is fastened to the weld nut by a bolt.

However, since the weld nut is fixed to one component by welding, a welding portion applied to the mechanical coupling portion and may have durability concerns caused by a welding defect or corrosion. In particular, when the welding portion is applied to components of a suspension system of a vehicle body for a vehicle, the welding portion becomes an input point that lacks rigidity for an external load. Therefore, a nut integrated with a bracket is desired. Accordingly the bracket and the nut are integrally formed as components of the suspension system of the vehicle body that require improved rigidity at an input point or the vehicle body components where application of the weld nut is difficult.

The above information disclosed in this section is merely for enhancement of understanding of the background of the disclosure and therefore it may contain information that does not form the prior art that is already known in this country to a person of ordinary skill in the art.

SUMMARY

The present disclosure provides a nut integrated with a bracket that is formed by forming a beading portion using a drawing process on a plate material supplied between a punch and a die. The nut is then formed (integrally with the bracket) through piercing, forging, and cam upsetting processes, integrally with the bracket. The bracket supports a tip of the nut while surrounding both sides of the nut thus the rigidity at an input point when the nut integrated with the bracket is applied to a coupling portion of a component of a suspension system of a vehicle body.

The present disclosure further provides a nut integrated with a bracket. The nut has a protruding end that extends in a longitudinal direction on a tip surface of the nut to support both end portions of the bracket to provide joint rigidity, and a method of manufacturing the same.

An example embodiment of the present disclosure provides a method of manufacturing a nut integrated with a bracket, by using a plate material supplied between a punch and a die. The method may include a pre-drawing operation S1 of forming a reference aperture and a processing cross section in the plate material supplied between the punch and the die, forming a beading portion by processing the processing cross section through multiple steps, and piercing a center of the beading portion; a forging operation S2 of forming a pipe portion having a tube shape by gradually widening an aperture in the beading portion and decreasing a diameter of the pipe portion from the processing cross section to a tip of the beading portion, and then processing an exterior circumferential surface of the pipe portion to form the tube shape through multiple steps to increase a thickness from the tip of the pipe portion to the processing cross section, subsequent to the pre-drawing operation.

Further, the method may include a precision forging operation S3 of more accurately adjusting dimensions of an interior diameter and an exterior diameter of the pipe portion formed in the tube shape, forming a protruding end that extends on a tip surface of the pipe portion and then compressing the pipe portion to remove residual burrs on a surface thereof, subsequent to the forging operation; and a post-processing operation S4 of cutting the processing cross section to a final product shape, forming bent ends supported on the protruding end, at both end portions of the cut processing cross section, and forming a threaded tap on an interior circumferential surface of the pipe portion, subsequent to the precision forging operation.

The pre-drawing operation S1 may include a cutting operation S11 of forming the reference aperture at each edge of the supplied plate material, and simultaneously partially cutting the plate material along the edge of the plate material to obtain the processing cross section required to process the nut; and a drawing operation S12 of forming the beading portion in the processing cross section of the plate material, to gradually increase a depth of the beading portion is and gradually decrease an area of the beading portion, and gradually increase a thickness of the beading portion, subsequent to the cutting operation and a piercing operation S13 of forming the aperture at a center of a bottom surface of the beading portion formed by the drawing operation. In addition, in the drawing operation S12, the beading portion may be formed about a central portion of the processing cross section. The beading portion may be formed to protrude in a downward direction with respect to the processing cross section.

The precision forging operation S3 may include an upsetting operation S31 more accurately adjusting the dimensions of the interior diameter and the exterior diameter of the pipe portion by compressing the pipe portion formed in the tube shape in a longitudinal direction through multiple steps, subsequent to the forging operation; a cam upsetting operation S32 of integrally forming the protruding end, which extends in the longitudinal direction on the tip surface of the pipe portion, by compressing the interior and exterior circumferential surfaces and a tip portion of the pipe portion with adjusted dimensions, to predetermined shapes, subsequent to the upsetting operation; and a cam rest burring operation S33 of removing residual burrs on a surface of the pipe portion by compressing the interior and exterior circumferential surfaces and the tip portion of the pipe portion with the protruding end, to predetermined shapes, subsequent to the cam upsetting operation.

In addition, the cam upsetting operation S32 may be performed by left and right cam dies configured to move toward both sides, and upper and lower punches configured to operate in an upward direction and in a downward direction. The cam rest burring operation S33 may be performed by left and right cam dies configured to move toward both sides, and an upper punch configured to operate in an upward direction and in a downward direction.

The post-processing operation S4 may include a blanking operation S41 of cutting the processing cross section along an effective shape to be formed as a final product, subsequent to the cam rest burring operation; a flanging operation S42 of forming a final product-shaped bracket having the bent ends formed by bending, multiple times, both end portions of the effective processing cross section, integrally formed with the pipe portion, to predetermined shapes to support the tips of the bent ends at both sides on the protruding end, subsequent to the blanking operation; and a tapping operation S43 of forming the nut by processing the threaded tap on the interior circumferential surface of the pipe portion, subsequent to the flanging operation.

In addition, in the flanging operation S42, the effective processing cross section may have a rectangular shape having the pipe portion formed at a center thereof. In the flanging operation S42, the bent ends may be formed by repeated by bending (e.g. twice) both end portions of the bracket, which have a greater length, to surround both sides of the pipe portion, respectively.

Another exemplary embodiment of the present disclosure may include a nut integrated with a bracket. The nut may include a threaded tap disposed on an interior circumferential surface of a pipe portion and integrally formed with a protruding end that extends in a longitudinal direction on a tip surface of the pipe portion that may be integrally formed with the bracket by the method of manufacturing the nut integrated with the bracket.

In some exemplary embodiments, the pipe portion may be formed at a center of the rectangular bracket. The bracket may be formed by forming two-stepped bent ends at both end portions of the bracket, respectively. Additionally, each of the two-stepped bent ends may have a support groove formed at a tip thereof. The two-stepped bent ends may be coupled to the protruding end by welding when the two-stepped bent ends are supported on the protruding end.

According to the exemplary embodiment of the present disclosure, the nut may be formed by forming a beading portion by performing a drawing process, through multiple steps, on a plate material supplied between the punch and the die, and performing the piercing, forging, and cam upsetting processes. The nut may be integrally formed with the bracket having both end portions formed to be bent through multiple steps to couple both end portions to the tip of the nut while surrounding both sides of the nut when the tips of both end portions abut the tip of the nut. Accordingly, the rigidity at an input point is increased when the nut integrated with the bracket is applied to a coupling portion of a component of a suspension system of the vehicle body.

In addition, according to the exemplary embodiment of the present disclosure, the protruding end, which extends in the longitudinal direction on the tip surface of the nut may be integrally formed having both end portions of the bracket coupled to the protruding end when both end portions are supported on the protruding end to provide joint rigidity.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Hereinafter, exemplary embodiments of the present disclosure will be described in detail with reference to the accompanying drawings, in which exemplary embodiments of the disclosure are shown. While the invention will be described in conjunction with exemplary embodiments, it will be understood that present description is not intended to limit the invention to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The size and thickness of each component illustrated in the drawings are arbitrarily shown for understanding and ease of description, but the present disclosure is not limited thereto. Thicknesses of several portions and regions are enlarged for clearly describing the above. In addition, parts irrelevant to the description will be omitted to clearly describe the exemplary embodiments of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 1:
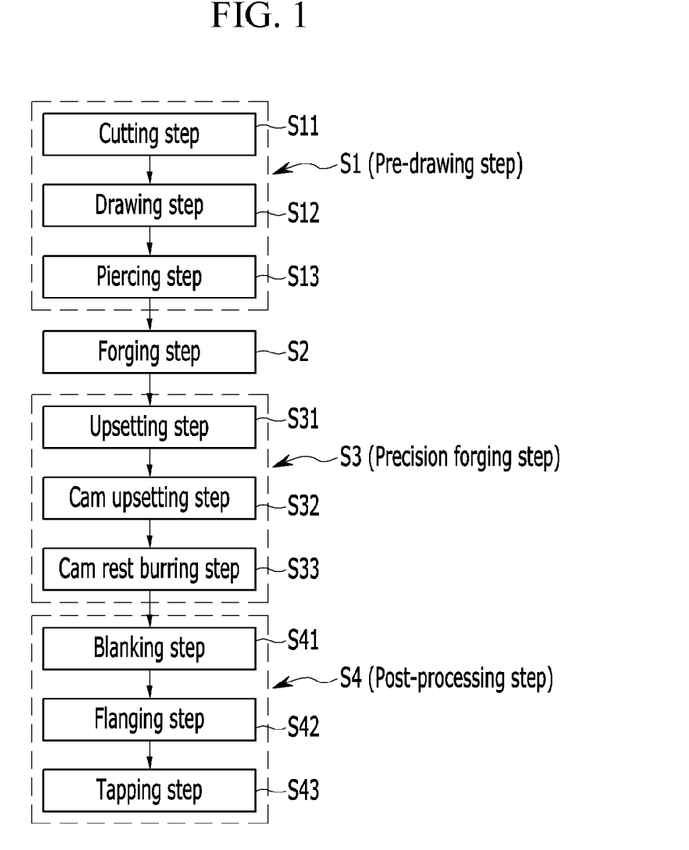
FIG. 1 is an exemplary process block diagram for each step according to a method of manufacturing a nut integrated with a bracket according to an exemplary embodiment of the present disclosure.
Figure 2:
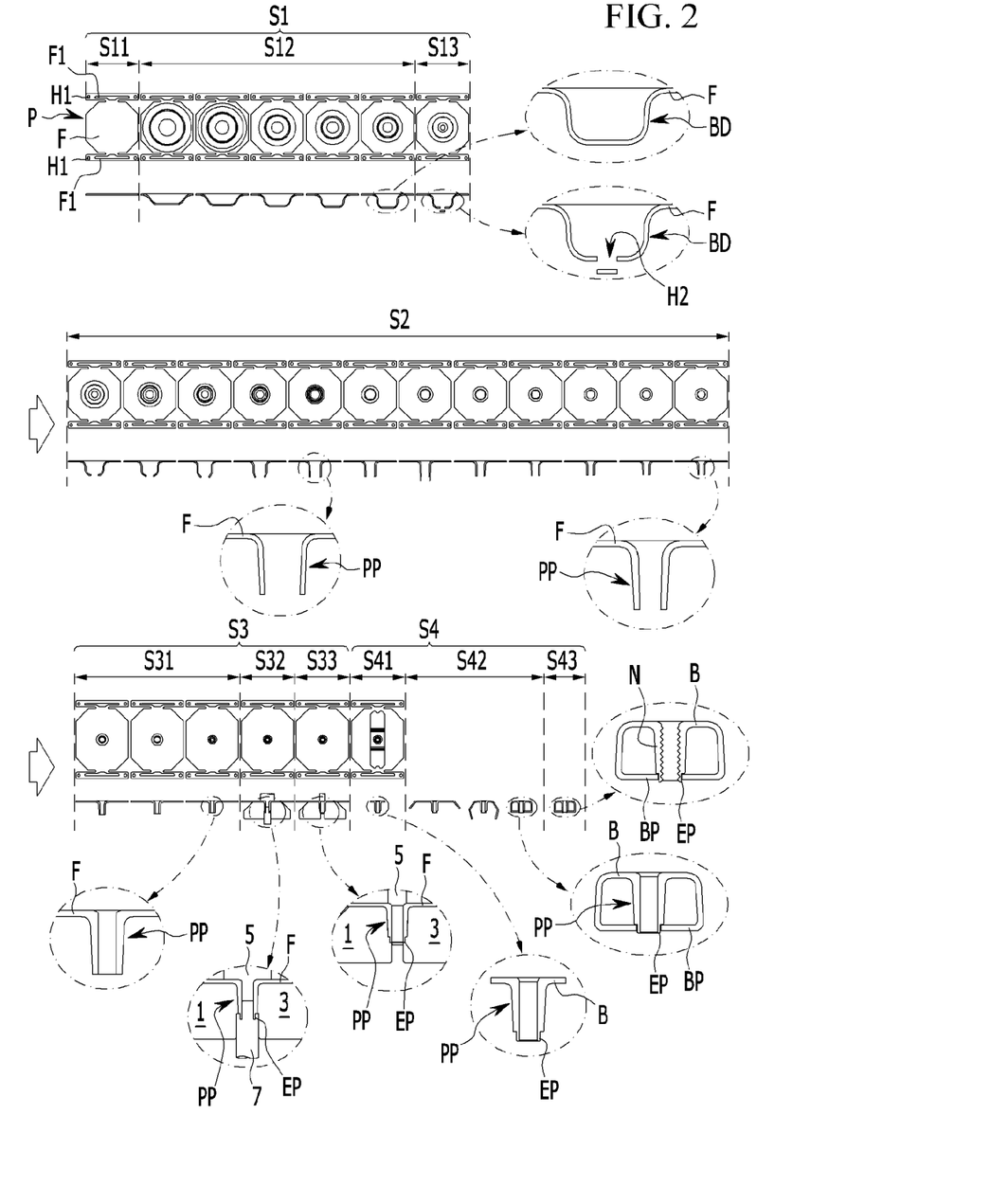
FIG. 2 is an exemplary process diagram according to the method of manufacturing the nut integrated with the bracket according to an example according to the exemplary embodiment of the present disclosure.

FIG. 1 is an exemplary process block diagram for each operation according to a method of manufacturing a nut integrated with a bracket according to an exemplary embodiment of the present disclosure. FIG. 2 is an exemplary process diagram for each operation according to the method of manufacturing the nut integrated with the bracket according to the exemplary embodiment of the present disclosure. Referring to FIGS. 1 and 2, a method of manufacturing a nut integrated with a bracket according to an exemplary embodiment of the present disclosure may form the nut integrated with the bracket having a bracket B and a nut N that are integrally formed by using a plate material P supplied between a punch and a die through an overall twenty-four-step process.

The method of manufacturing the nut integrated with the bracket according to an exemplary embodiment of the present disclosure includes a pre-drawing operation S1 with a cutting operation S11, a drawing operation S12, and a piercing operation S13, a forging operation S2, a precision forging operation S3 with an upsetting operation S31, a cam upsetting operation S32, and a cam rest burring operation S33 and a post-processing operation S4 which may further include a blanking operation S41, a flanging operation S42, and a tapping operation S43.

First, the pre-drawing operation S1 may include forming reference apertures H1 and processing cross sections F in the plate material P supplied between the punch and the die. The beading portions BD may be formed by processing the processing cross section F through multiple steps, and a process of piercing a center of the beading portion BD.

In particular, the cutting operation S11 may form the circular reference apertures H1 at each edge of the supplied plate material P using the punch and the die. The plate material P may be simultaneously cut along the edge of the plate material P to obtain the processing cross section F required to process the nut. In particular, the processing cross section F may define an octagonal contour and reference surfaces F1, which have the reference apertures H1 may be connected to both sides of the processing cross section F, respectively.

Further, the drawing operation S12 may be performed subsequent to the cutting operation S11 and may include a five-step process that uses the punch and the die. The drawing operation S12 may form the beading portion BD in the processing cross section F of the plate material P to gradually increase a depth of the beading portion BD, to gradually decrease an area of the beading portion BD, and to gradually increase a thickness of the beading portion BD. In other words, the beading portion BD may be formed about a central portion of the processing cross section F and may be formed to protrude in a downward direction with respect to the processing cross section F.

In addition, the piercing operation S13 may include a single-step process of forming, using the punch and the die. An aperture H2 at a center of a bottom surface of the beading portion BD formed by the drawing operation S12. Further, the forging operation S2 may be performed subsequent to the piercing operation S13 and may include a twelve-step process using the punch and the die.

The first to fifth steps of the forging operation S2 may form a pipe portion PP having a tube shape by widening the aperture H2 in the beading portion BD and decreasing a diameter of the pipe portion PP from the processing cross section F to a tip of the beading portion BD. Thereafter, the sixth to twelfth steps of the forging operation S2 may process an exterior circumferential surface of the pipe portion PP to form the tube shape through multiple steps to increase a thickness from the tip of the pipe portion PP to the processing cross section F.

Further, the precision forging operation S3 may be performed subsequent to the forging operation S2 and may include a process of more accurately adjusting dimensions of an inner diameter and an outer diameter of the pipe portion PP formed in the tube shape, forming a protruding end EP that extends on a tip surface of the pipe portion PP, and then compressing the pipe portion PP to remove residual burrs on a surface thereof. In other words, the upsetting operation S31 may compress the pipe portion PP, formed in a tube shape by the forging step S2, in a longitudinal direction by using the punch and the die through a three-step process, thereby precisely adjusting the dimensions of the inner diameter and the outer diameter of the pipe portion PP.

In addition, the cam upsetting operation S32 may compress through a single-step process, the inner and outer circumferential surfaces and the tip portion of the pipe portion PP of which the dimensions are adjusted by the upsetting operation S31, to predetermined shapes. to integrally form the protruding end EP that extends in the longitudinal direction on the tip surface of the pipe portion PP. The cam upsetting operation S32 may be performed by left and right cam dies 1 and 3 configured to operate toward both sides, and upper and lower punches 5 and 7 configured to operate upward and downward. For example, the protruding end EP may be formed in a cylindrical shape in the longitudinal direction on the tip surface of the pipe portion PP and may have an inner diameter identical to an inner diameter of the pipe portion PP.

In addition, the cam rest burring operation S33 may compress the inner and outer circumferential surfaces and the tip portion of the pipe portion PP. The protruding end EP may be formed by the cam upsetting operation S32 to predetermined shapes through a single-step process. Accordingly, the residual burrs on the surface of the pipe portion PP may be removed. The cam rest burring operation S33 may be performed by the left and right cam dies 1 and 3 configured to operate toward both sides and the upper punch 5 configured to operate upward and downward.

Further, the post-processing operation S4 may be performed subsequent to the precision forging operation S3 and may include cutting the processing cross section F to a final product shape, forming the protruding end EP at both end portions of the cut processing cross section F, and forming a threaded tap on the inner circumferential surface of the pipe portion PP. In other words, the blanking operation S41 may cut the processing cross section F including the pipe portion PP formed by the cam rest burring operation S33, along an effective shape to be formed as a final product through a single-step process using a trimming die (not illustrated). In particular, the processing cross section F, which is cut together with the pipe portion PP may be formed as the bracket B in subsequent processes.

In addition, the flanging operation S42 may form the final product-shaped bracket B having bent ends BP formed by bending twice both end portions of the effective processing cross section F integrally formed with the pipe portion PP by the blanking operation S41 to predetermined shapes. For example, the effective processing cross section F may have a rectangular shape having the pipe portion PP formed at a center thereof. The flanging operation S42 may have the bent ends BP formed by repeated bending (e.g., twice) both end portions of the bracket B, which have a greater length to surround both sides of the pipe portion PP with the tips of the bent ends BP at both sides supported on the protruding end EP. The flanging operation S42 may be performed through a single-step process using a bending die (not illustrated). Further, the tapping operation S43 may form the nut N by processing a thread on the interior circumferential surface of the pipe portion PP using a tapping mechanism (not illustrated).

Figure 3:
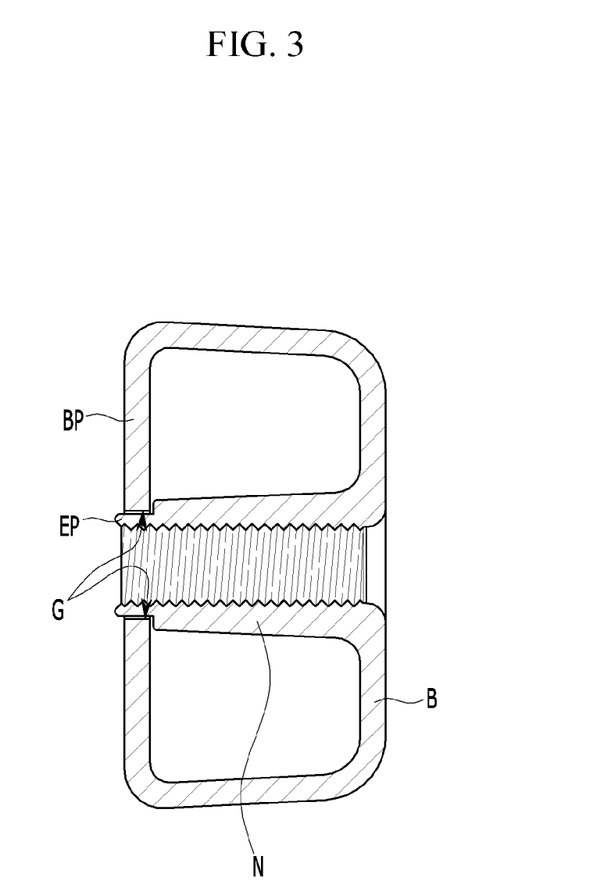
FIG. 3 is an exemplary cross-sectional view of the nut integrated with the bracket according to the exemplary embodiment of the present disclosure.
Figure 4:
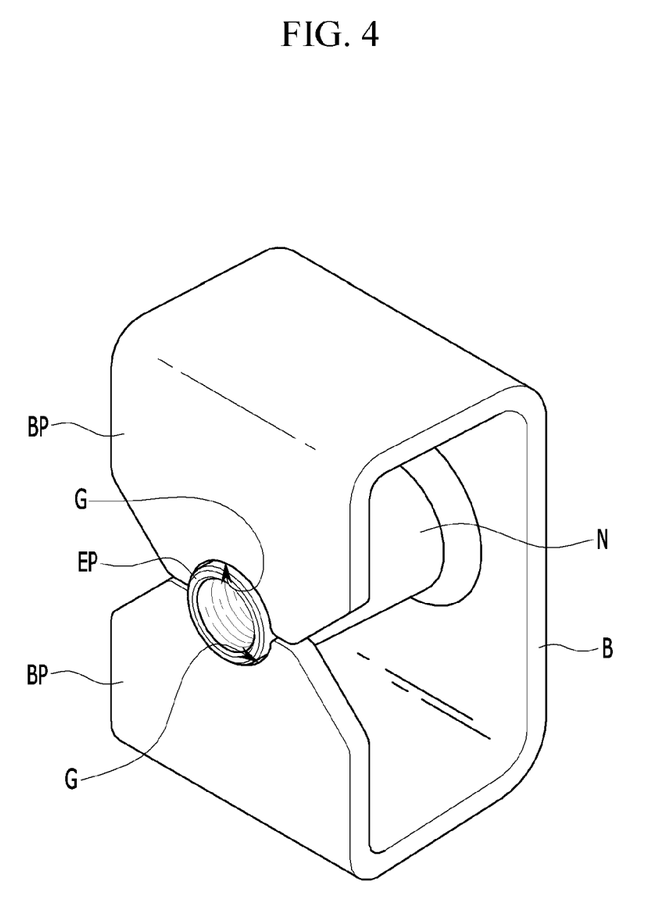
FIG. 4 is an exemplary perspective view of the nut integrated with the bracket according the exemplary embodiment of the present disclosure.

FIG. 3 is an exemplary cross-sectional view of the nut integrated with the bracket according to the exemplary embodiment of the present disclosure. FIG. 4 is an exemplary perspective view of the nut integrated with the bracket according to the exemplary embodiment of the present disclosure. Therefore, with the aforementioned method of manufacturing the nut integrated with the bracket, the nut integrated with the bracket may be manufactured, as illustrated in FIGS. 3 and 4.

In particular, in the nut integrated with the bracket according to an exemplary embodiment of the present disclosure, the thread may be disposed on the inner circumferential surface of the pipe portion PP. The N may be integrally formed with the protruding end EP that extends in the longitudinal direction on the tip surface. The nut N may be integrally formed at the center of the bracket B having the two-stepped bent ends BP formed by bending twice both end portions. In particular, the pipe portion PP may be formed at the center of the rectangular bracket B and support grooves G may be formed at the tips of the two-stepped bent ends BP, respectively. Accordingly, the two-stepped bent ends BP may be coupled to the protruding end EP by welding when the two-stepped bent ends BP are supported on the protruding end EP.

For example, the tips of the two-stepped bent ends BP at both sides may be coupled to and supported on the protruding end EP and thus the nut integrated with the bracket may be formed in an overall quadrangular shape or the like. Therefore, the method of manufacturing the nut integrated with the bracket according to the exemplary embodiment of the present disclosure may provide the nut integrated with the bracket by forming the beading portion BD first by performing the drawing process, through multiple steps, on the plate material P supplied between the punch and the die, and then forming the nut N, which has the protruding end EP on the tip surface thereof, integrally with the bracket B through the piercing, forging, and cam upsetting processes. Accordingly, the nut integrated with the bracket may be applied to a coupling portion of a vehicle body component and to a vehicle body component of a suspension system to increase rigidity at an input point.

In addition, the nut integrated with the bracket having the protruding end EP that extends in the longitudinal direction on the tip surface of the nut N may be provided and the tips of the bracket B may be supported at both sides of the protruding end EP, thereby improving structural durability.

While this disclosure has been described in connection with what is presently considered to be exemplary embodiments, it is to be understood that the disclosure is not limited to the disclosed exemplary embodiments, but, on the contrary, is intended to cover various modifications and equivalent arrangements included within the spirit and scope of the appended claims.

What is claimed is:

1. A method of manufacturing a nut integrated with a bracket, the method comprising:
    forming a reference aperture and a processing cross section in a plate material supplied between a punch and a die during a pre-drawing operation;
    forming a beading portion in the processing cross section, and piercing a center of the beading portion during the pre-drawing operation;
    forming a pipe portion having a tube shape by gradually widening an aperture formed by piercing the center of the beading portion and decreasing a diameter of the pipe portion from the processing cross section to a tip of the beading portion during a forging operation;
    adjusting dimensions of the diameter of the pipe portion formed in the tube shape during a precision forging operation;
    forming a protruding end that extends on a tip surface of the pipe portion, subsequent to the forging operation;
    cutting the processing cross section to a final product shape, forming bent ends, which are supported on the protruding end, at both end portions of the cut processing cross section during a post processing operation; and
    forming a threaded tap on an inner circumferential surface of the pipe portion, subsequent to the precision forging operation,
    wherein the precision forging operation includes:
        adjusting the dimensions of the pipe portion during an upsetting operation by compressing the pipe portion, formed in the tube shape, in a longitudinal direction subsequent to the forging step; and
        removing residual burrs on a surface of the pipe portion during a cam rest burring operation by compressing interior and exterior circumferential surfaces and a tip portion of the pipe portion with the protruding end subsequent to the cam upsetting operation, wherein the cam rest burring operation is performed by left and right cam dies, and an upper punch configured to move in an upward direction and a downward direction,
    wherein the post-processing operation includes:
        cutting the processing cross section along an effective shape during a blanking operation, subsequent to the cam rest burring operation;
        forming the bracket during a flanging operation in which the bent ends are formed by bending the end portions of the processing cross section, and tips of the bent ends are supported on the protruding end, subsequent to the blanking operation; and
        forming the nut by processing the threaded tap on an interior circumferential surface of the pipe portion during a tapping operation, subsequent to the flanging operation, and
    wherein in the flanging operation, the end portions of the bracket are bent to surround both sides of the pipe portion, respectively.

2. The method of claim 1, wherein the pre-drawing operation includes:
    forming the reference aperture at each edge of the supplied plate material, and simultaneously partially cutting the plate material along the edge of the plate material to obtain the processing cross section required to process the nut during a cutting operation;
    forming the beading portion in the processing cross section of the plate material during the pre-drawing operation, through multiple steps, to gradually increase a depth of the beading portion, gradually decrease an area of the beading portion, and gradually increase a thickness of the beading portion, subsequent to the cutting operation; and forming the aperture by piercing a center of a bottom surface of the beading portion formed by the pre-drawing operation.

3. The method of claim 2, wherein the beading portion is formed about a central portion of the processing cross section during the drawing operation.

4. The method of claim 3, wherein the beading portion is formed to protrude in a downward direction with respect to the processing cross section.

5. The method of claim 1, wherein the cam upsetting operation is performed by left and right cam dies configured to move side-to-side, and upper and lower punches configured to move in an upward direction and a downward direction.

6. The method of claim 1, wherein in the flanging step, the effective processing cross section has a rectangular shape having the pipe portion formed at a center thereof.

\* \* \* \* \*